United States Patent [19]
Ajioka et al.

[11] Patent Number: 5,434,004
[45] Date of Patent: Jul. 18, 1995

[54] DEGRADABLE LAMINATE COMPOSITION

[75] Inventors: Masanobu Ajioka; Katashi Enomoto; Akihiro Yamaguchi, all of Kanagawa; Hosei Shinoda, Aichi, all of Japan

[73] Assignee: Mitsui Toatsu Chemicals, Incorporated, Tokyo, Japan

[21] Appl. No.: 338,791

[22] Filed: Nov. 8, 1994

Related U.S. Application Data

[63] Continuation of Ser. No. 880,074, May 5, 1992, abandoned.

[30] Foreign Application Priority Data

May 13, 1991 [JP] Japan .................. 3-107052
Aug. 8, 1991 [JP] Japan .................. 3-199164

[51] Int. Cl.$^6$ .................. B32B 3/10; B32B 3/26; A61K 31/74
[52] U.S. Cl. .................. 428/411.1; 428/290; 428/395; 428/473; 428/537.5; 428/913
[58] Field of Search .................. 428/137, 138, 311.5, 428/316.6, 411.1; 162/129, 130, 132, 219; 424/78

[56] References Cited

U.S. PATENT DOCUMENTS

| | | | |
|---|---|---|---|
| 3,844,987 | 10/1974 | Clendinning et al. | 528/354 |
| 3,859,125 | 1/1975 | Miller et al. | 428/913 |
| 4,057,537 | 11/1977 | Sinclair | 528/357 |
| 4,985,510 | 1/1991 | Akiyama et al. | 428/475.5 |
| 5,143,773 | 9/1992 | Zakuno | 428/317.9 |

FOREIGN PATENT DOCUMENTS 1397570 6/1975 United Kingdom .
WO92/05311 4/1992 WIPO .

*Primary Examiner*—George F. Lesmes
*Assistant Examiner*—Kathryne E. Shelborne
*Attorney, Agent, or Firm*—Burns, Doane, Swecker & Mathis

[57] ABSTRACT

A laminate comprising a thermoplastic polymer essentially consisting of polylactic acid, a copolymer of lactic acid and hydroxycarboxylic acid or a mixture of polylactic acid with a copolymer of lactic acid and hydroxycarboxylic acid, and a regenerated cellulose film, paper, leather, cloth, or fiber. The laminate undergoes degradability in the natural environment, is excellent in transparency, gloss and moisture-proofness, has high strength and can be used for various packaging materials.

4 Claims, No Drawings

DEGRADABLE LAMINATE COMPOSITION

This application is a continuation of application Ser. No. 07/880,074, filed May 5, 1992, now abandoned.

BACKGROUND OF THE INVENTION

1. Field of the Invention

The present invention relates to a laminated composition comprising a thermoplastic polymer having degradability in the natural environment and a regenerated cellulose film (cellophane), paper, leather, cloth or fiber. More particularly, the invention relates to a degradable, laminated composition comprising a polymer essentially consisting of polylactic acid or a lactic acid-hydroxycarboxylic acid copolymer and cellophane, paper, leather, cloth or fiber. The laminated composition can be used as moisture-proof packaging papers, decorative papers, containers for milk and juice, and other packaging materials. These materials can be readily degraded after use in the natural environment.

2. Related Art of the Invention

The amount of packaging plastics has recently been increased in view of beauty, hygiene, packaging and transport of commodities. As a result of such trend, the amount of refuse discarded from households and factories has rapidly increased and the shortage of burial site has caused a serious problem around cities.

A regenerated cellulose film called cellophane, paper, leather, natural fiber or cloth prepared from natural fibers has degradability in the natural environment, is degraded in a long period though buried under the ground, and does not develop hazardous gas in the case of incineration. Some materials are recovered and reused in view of resource protection. Thus these degradable materials are used for disposable wrapping papers, containers and other various packaging materials in place of difficultly degradable plastics and are expected to have increased uses in the future.

However, a laminated composition comprising a thermo-plastic polymer having degradability in the natural environment and a regenerated cellulose film (cellophane), paper, leather, cloth or fiber has not yet been known.

Cellophane has a substantial much demand as a packaging material which is excellent in transparency, impermeability to gases, easy printability and gloss. However, cellophane is inferior in moisture-proofness, low-temperature resistance, strength and heat-sealing characteristic, and hence is usually used by being laminated with a synthetic polymer in order to compensate for these drawbacks. Packaging papers and paper containers have low strength and poor water resistance and thus paper packs and paper cups for milk and juices are prepared from laminated paper obtained by laminating a polymer and paper. Book covers and dressing cases are generally prepared from laminated paper having a smooth surface and gloss in order to satisfy the desire of the consumer for beauty. Leather, cloth and fiber are also used for wrapping papers, containers and other various packaging materials as principal or secondary components and have similar disadvantages.

Polymers for use in these uses have been polyolefins such as polyethylene and polypropylene, and paper-coating polyester. These polymers, however, have almost no degradability in the natural environment. When laminates are abandoned and buried under the ground, these polymers greatly lower the degradation rate of cellophane, paper, leather and cloth which are substantially degradable in the natural environment. A large amount of heat generated in the incineration of these polymers leads to problems such as damage to the furnace. When the laminates are recovered, problems occur in separating these polymers.

Polylactic acid and lactic acid copolymers have recently been known as thermoplastic and biodegradable polymers. These lactic acid polymers can be completely biodegraded within several months to a year in an animal body. When the polymers are placed in soil or sea water, the polymers start to decompose within several weeks in a moist environment and disappear in about a year. The degradation products of these polymers are lactic acid, carbon dioxide and water, and all of these compounds are nontoxic.

U.S. Pat. Nos. 1,995,970, 2,362,511, and 2,683,136 have disclosed a polymerization process of lactic acid. U.S. Pat. Nos. 3,636,956 and 3,797,499 have disclosed a process for copolymerizing lactic acid and glycolic acid. Polymers of lactic acid are usually prepared from a cyclic dimer of lactic acid which is called lactide. In the copolymerization of lactic acid, lactide and glycolide, i.e., a dimer of glycolic acid, are mixed and ring-opening polymerization is carried out. When the polymer is directly prepared through dehydrating condensation from lactic acid or a mixture of lactic acid and glycolic acid, a high molecular weight polymer cannot be obtained even though the reaction is carried out for a long time. On the other hand, the ring-opening polymerization of lactide or of a mixture of lactide and glycolide can provide a high molecular weight straight-chain polyester.

SUMMARY OF THE INVENTION

One object of the invention is to provide a laminated composition comprising a polymer which can be degraded with ease in the natural environment and generates harmless degradation products, and cellophane, paper, leather, cloth or fiber. This object has been accomplished by finding out that a polymer essentially consisting of polylactic acid or a copolymer of lactic acid and hydroxycarboxylic acid can be strongly adhered to a substrate such as cellophane, paper, leather, cloth or fiber by adhering or applying the polymer to the substrate in the form of a film or a solution, and further that the laminated composition is excellent in transparency, gloss and moisture-proofness, and has high mechanical strength.

That is, one aspect of the invention is a degradable, laminated composition comprising a thermoplastic, degradable polymer essentially consisting of poly lactic acid or a copolymer of lactic acid and hydroxycarboxylic acid, and a regenerated cellulose film, paper, leather, cloth and fiber.

DETAILED DESCRIPTION OF PREFERRED EMBODIMENTS

The polymer used in the invention is a mixture of polylactic acid with a polymer of another hydroxycarboxylic acid or a copolymer of lactic acid and another hydroxycarboxylic acid.

The raw materials of the polymer are lactic acid, lactide which is a cyclic dimer of lactic acid, and other hydroxycarboxylic acids. Other hydroxycarboxylic acids include, for example, glycolic acid, 3-hydroxybutyric acid, 4-hydroxybutyric acid, 4-hydroxyvaleric acid, 5-hydroxyvaleric acid and 6-hydroxycaproic acid. Other materials can be used as a mixture, if desired.

These polymers can be directly prepared through dehydrating polycondensation from lactic acid or other hydroxycarboxylic acid or through ring-opening polymerization from lactide, glycolide, ε-caprolactone or a mixture of these compounds. A copolymer prepared by transesterification of polylactic acid with other hydroxycarboxylic acid polymers can also be used. The lactic acid unit which constitutes these polymers can be L-lactic acid, D-lactic acid or a mixture of these lactic acids.

A preferred polymer has an average molecular weight of from 10,000 to 1,000,000, and a polymerization degree of from 150 to 20,000. An average molecular weight lower than this range leads to low strength of processed products such as film and hence is unsuitable for practical use. When the average molecular weight is higher than this range, processing ability becomes poor because of high viscosity in the hot-melt state.

Plasticizers can be added in order to provide flexibility for the above polymers. Plasticizers which can be used include, for example, diethyl phthalate, dioctyl phthalate, dicyclohexyl phthalate and other phthalic acid esters; di-isobutyl adipate, di-n-octyl adipate, di-n-butyl sebacate, di-2-ethylhexyl sebacate, di-2-ethylhexyl azelate and other aliphatic dicarboxylic acid esters; diphenyl 2-ethylhexyl phosphate, diphenyl octyl phosphate and other phosphoric acid esters; tributyl acetylcitrate, tri-2-ethylhexyl acetylcitrate, tributyl citrate and other hydroxypolycarboxylic acid esters; methyl acetylricinoleate, amyl stearate and other aliphatic carboxylic acid esters; glycerol triacetate, triethylene glycol dicaprylate and other polyhydric alcohol esters; epoxylated soybean oil, octyl epoxystearate and other epoxy-base plasticizers; and polypropylene glycol adipate, polypropylene glycol sebacate and other polyester base plasticizers. Safe plasticizers are preferably used for food packaging containers.

The amount of the plasticizer for use is usually from 5 to 50% by weight, preferably from 5 to 20% by weight for the polymer composition. The plasticizer is added to the polymer as a solution in a solvent or in molten state.

No particular restriction is imposed on the cellophane used for the laminated composition of the invention. Common cellophane and moisture-proof cellophane are used.

Exemplary paper for use in the invention includes art paper (coated paper), kraft paper, rolled sheet, rice paper, and other processing base-paper, cross paper and paper-board. The above paper may contain regenerated pulp.

The leather used in the invention is a natural product, and parchment-like thin leather and thick leather can also be used.

The fiber or cloth for use in the invention is a natural fiber or a cloth prepared from the natural fiber.

Exemplary natural fiber includes cotton, silk and wool. The fiber includes thread. The cloth includes bands and may be textiles or nonwoven fabrics. The fiber and cloth are preferably composed of natural product and may contain some artificial product, if desired.

Lamination can be carried out by various method such as solution coating method, hot-melt method and extrusion lamination method.

When an adhesive is used, it is preferred to use decomposable adhesives such as glue, gelatin, casein and starch. However, some kinds of paper do not use adhesive in order to avoid disturbance for the degradation of the laminated composition. The surface of cellophane, paper, leather, cloth or fiber can also be anchor-coated prior to lamination with an organic titanium compound, organic silane compound or polyethyleneimine. In some cases, paper can be previously impregnated with lactic acid, other hydroxycarboxylic acid, lactide, glycolide or ε-caprolactone.

The degradable, laminated composition of the present invention can be further laminated with other films, for example, aluminum foil.

The present invention will hereinafter be illustrated in detail by way of examples. However, these examples are not intended to limit the scope of the present invention.

EXAMPLE 1

A cellophane film having dimensions of 150×150 mm and a thickness of 50 μm was coated with a 30% aqueous gelatin solution as an adhesive. A polymer film having a thickness of 30μm was prepared from poly-L-lactic acid having a weight average molecular weight of 150,000, overlapped on the gelatin-coated surface, pressed overnight under a pressure of 1 kg/cm$^2$ and successively dried at 60° C. for a day.

Adhesion between the cellophane and the polymer film was good, and the laminated film thus obtained was strong.

The laminated film was buried in a compost at 40° C. for 2 months. After the test, the polymer film on the surface was deteriorated and could be crushed with ease by external force.

EXAMPLE 2

A cellophane film having dimensions of 150×150 mm and a thickness of 50 μm was overlapped with the same poly-L-lactic acid film as used in Example 1 and pressed at 200° C. for 5 minutes under a pressure of 30 kg/cm$^2$.

The laminated film thus obtained had good adhesion between the cellophane and the polymer film, and was strong and good in surface gloss.

The laminated film was buried in a compost at 40° C. for 2 months. After the test, the polymer film was deteriorated and could be crushed with ease by external force.

EXAMPLE 3

A laminated film was prepared by carrying out the same procedures as described in Example 2 except that the poly-L-lactic acid film was replaced by a film which had a thickness of 25μm and was prepared from a copolymer having a weight average molecular weight of 110,000 and consisting of L-and D-lactic acid in a ratio of 9:1.

Adhesion between the cellophane and the polymer film was good, and the laminated film thus obtained was strong and had good surface gloss.

The laminated film was buried in a compost at 40° C. for 2 months. After the test, the polymer film on the surface was deteriorated and could be crushed with ease by external force.

EXAMPLE 4

A laminated film was prepared by carrying out the same procedures as described in Example 2 except that the poly-L-lactic acid film was replaced by a film which had a thickness of 25μm and was prepared from a copolymer having a weight average molecular weight of 50,000 and consisting of L-lactic acid and glycolic acid in a ratio of 1:1.

Adhesion between cellophane and the polymer film was good, and the laminated film thus obtained was strong and had good surface gloss.

The laminated film was buried in a compost at 40° C. for 2 months. After the test, the polymer film on the surface was deteriorated and could be crushed with ease by external force.

EXAMPLE 5

A laminated film was prepared by carrying out the same procedures as described in Example 2 except that the poly-L-lactic acid film was replaced by a film which had a thickness of 25μm and was prepared from a copolymer having a weight average molecular weight of 60,000 and consisting of L-lactic acid and 6-hydroxycaproic acid in a ratio of 1:1.

Adhesion between cellophane and the polymer film was good and the laminated film obtained was strong and had good surface gloss.

The laminated film was buried in a compost at 40° C. for 2 months. After the test, the polymer film was deteriorated and could be crushed with ease by external force.

EXAMPLE 6

A cellophane film having dimensions of 150×150 mm and a thickness of 50 μm was coated with 2.0 g of a 15% chloroform solution of poly-L-lactic acid having a molecular weight of 110,000 and dried overnight at room temperature.

The laminated film was buried in a compost at 40° C. for a month. After the test, the polymer film was deteriorated and could be crushed with ease by external force.

EXAMPLE 7

A kraft paper having dimensions of 150×150 mm and a basis weight of 82 g/m² was coated with a 30% aqueous gelatin solution as an adhesive, overlapped with a film which was prepared from poly-L-lactic acid having a weight average molecular weight of 150,000 and had thickness of 30 μm, and pressed overnight under a pressure of 1 kg/cm².

Adhesion between the paper and the polymer film was good and the laminated paper obtained was strong. The laminated paper was heated to 60° C. in a 1 N aqueous sodium hydroxide solution. After an hour, the polymer layer on the surface was dissolved into the solution, and the residual paper portion could be torn with ease.

The laminated paper was buried in soil for a month. After the test, the film on the surface was deteriorated and could be torn with ease.

EXAMPLE 8

A wood free paper having dimensions of 150×150 mm and a basis weight of 65.5 g/m² was overlapped with a poly-L-lactic acid film as used in Example 7 and pressed at 200° C. for 3 minutes under the pressure of 30 kg/cm².

Adhesion between the paper and the polymer film was good, and the laminated film obtained was strong and had good surface gloss.

The laminated film was heated to 60° C. in a 1 N aqueous sodium hydroxide solution. After an hour, the polymer layer on the surface was dissolved into the solution, and the residual paper portion was buried in soil for a month.

After the test, the film on the surface was deteriorated and could be torn with ease.

EXAMPLE 9

A laminated paper was prepared by carrying out the same procedures as described in Example 8 except that the poly-L-lactic acid film was replaced by a film which was prepared from a copolymer having a weight average molecular weight of 110,000 and consisting of L-lactic acid and D-lactic acid in a ratio of 1:1 and having a thickness of 25 μm.

Adhesion between the paper and the polymer film was good. The laminated film obtained was strong and had good surface gloss.

The laminated paper was heated to 60° C. in a 1 N aqueous sodium hydroxide solution. After an hour, the polymer layer on the surface was dissolved into the solution, and the residual paper portion could be torn with ease.

The laminated paper was buried in soil for a month. After the test, the polymer film on the surface was deteriorated and could be torn with ease.

EXAMPLE 10

A laminated paper was prepared by carrying out the same procedures as described in Example 8 except that the poly-L-lactic acid film was replaced by a film which was prepared from a copolymer having a weight average molecular weight of 50,000 and consisting of L-lactic acid and glycolic acid in a ratio of 1: 1 and having a thickness of 25 μm.

Adhesion between the paper and the polymer film was good. The laminated film obtained was strong and had good surface gloss.

The laminated paper was heated to 60° C. in a 1 N aqueous sodium hydroxide solution. After an hour, the polymer layer on the surface was dissolved into the solution, and the residual paper portion could be torn with ease.

The laminated paper was buried in soil for a month. After the test, the polymer film on the surface was deteriorated and could be torn with ease.

EXAMPLE 11

A laminated paper was prepared by carrying out the same procedures as described in Example 8 except that the poly-L-lactic acid film was replaced by a film which was prepared from a copolymer having a weight average molecular weight of 60,000 and consisting of L-lactic acid and 6-hydroxycaproic acid in a ratio of 1:1 and having a thickness of 25 μm.

Adhesion between the paper and the polymer film was good. The laminated film obtained was strong and had good surface gloss.

The laminated film was heated to 60° C. in a 1 N aqueous sodium hydroxide solution. After an hour, the polymer layer on the surface was dissolved into the solution, and the residual paper portion could be torn with ease.

The laminated paper was buried in soil for a month. After the test, the film on the surface was deteriorated, and could be torn with ease.

EXAMPLE 12

To a wood free paper having dimensions of 150×150 mm and a basis weight of 65.5 g/m², 2.0 g of a 15% chloroform solution of poly -L-lactic acid having a molecular weight of 110,000 was applied and dried overnight at the room temperature. The laminated composition thus obtained was further dried at 50° C. under reduced pressure. The laminated paper thus obtained was strong and had good surface gloss.

The laminated paper was heated to 60° C. in a 1 N aqueous sodium hydroxide solution. After an hour, the polymer layer on the surface was dissolved into the solution and the residual paper portion could be torn with ease.

The laminated paper was buried in soil for a month. After the test, the film on the surface was deteriorated and could be torn with ease.

EXAMPLE 13

A parchment having dimensions of 150×150mm and a thickness of 500μm was coated with an aqueous casein solution as an adhesive. A film which was prepared from poly-L-lactic acid having a weight average molecular weight of 150,000 and a thickness of 30 μm was overlapped on the coated surface and pressed overnight at room temperature under a pressure of 5 kg/cm² and successive dried at 60° C. for a day.

Adhesion between the parchment and the polymer film was good and the laminate thus obtained was strong.

The laminate was heated to 60° C. in a 1 N aqueous sodium hydroxide solution. After an hour, the polymer layer on the surface was dissolved into the solution, and the parchment was recovered and could be reused.

EXAMPLE 14

A cotton cloth having dimensions of 150×150 mm and a thickness of 300μm was treated with glyoxal, overlapped with a film which was prepared from poly-L-lactic acid having a weight average molecular weight of 150,000 and a thickness of 30 μm, pressed overnight at room temperature under a pressure of 5 kg/cm², and thereafter dried at 60° C. for a day.

Adhesion between the cotton cloth and the polymer film was good and the laminate thus obtained was strong.

The laminate was heated to 60° C. in a 1 N aqueous sodium hydroxide solution. After an hour, the polymer film on the surface was dissolved into the solution, and the cotton cloth was recovered.

EXAMPLE 15

A polyamino acid fiber having a thickness of 50 μm was passed through a 15% chloroform solution of poly-L-lactic acid having a molecular weight of 110,000 to adhere poly-L-lactic acid to the surface of the fiber. After drying, the treated fibers were lengthwise and crosswise combined and hot pressed to obtain a nonwoven fabric.

A film which was prepared from poly-L-lactic acid having a weight average molecular weight of 150,000 and a thickness of 30 μm was overlapped on the above-obtained nonwoven fabric having dimensions of 150×150mm and a thickness of 200 μm, pressed overnight at the room temperature under a pressure of 5 kg/cm² and successively dried at 60° C. for a day.

Adhesion between the nonwoven fabric and the polymer film was good. The laminated sheet thus obtained was strong.

The laminated sheet was buried in a compost at 40° C. for 2 months. After the test, the sheet was deteriorated and the shape of the sheet was destructed with ease by external force.

What is claimed is:

1. A degradable laminated article comprising a surface layer of a thermoplastic, degradable polymer consisting essentially of polylactic acid having an average molecular weight of 10,000 to 1,000,000 laminated to the surface of a regenerated cellulose film, paper, leather, or cloth.

2. The degradable laminated article of claim 1 wherein the polylactic acid is prepared from D-lactic acid, L-lactic acid or a mixture of these lactic acids.

3. The degradable laminated article of claim 1 wherein the polylactic acid is laminated to the surface of regenerated cellulose film.

4. The degradable laminated article of claim 1 wherein the polylactic acid is laminated to the surface of paper.

* * * * *